United States Patent
Clifton et al.

(10) Patent No.: US 12,241,998 B2
(45) Date of Patent: Mar. 4, 2025

(54) REMOTE SENSING DEVICE WITH DUPLEX OPTICAL ELEMENT AND RELATED METHODS

(71) Applicant: AGERPOINT, INC., New Smyrna Beach, FL (US)

(72) Inventors: William Clifton, New Smyrna Beach, FL (US); Neha Mohan Kadam, Edgewater, FL (US)

(73) Assignee: AGERPOINT, INC, Durham, NC (US)

( * ) Notice: Subject to any disclaimer, the term of this patent is extended or adjusted under 35 U.S.C. 154(b) by 975 days.

(21) Appl. No.: 17/307,094

(22) Filed: May 4, 2021

(65) Prior Publication Data
US 2021/0341582 A1  Nov. 4, 2021

Related U.S. Application Data

(60) Provisional application No. 63/019,500, filed on May 4, 2020.

(51) Int. Cl.
  *G01S 7/481*  (2006.01)
  *G01S 17/89*  (2020.01)

(52) U.S. Cl.
  CPC .......... *G01S 7/4811* (2013.01); *G01S 7/4817* (2013.01); *G01S 17/89* (2013.01)

(58) Field of Classification Search
  CPC .... G01S 7/4811; G01S 7/4812; G01S 7/4816; G01S 7/4817; G01S 7/484; G01S 7/486; G01S 7/4868; G01S 17/88; G01S 17/89
  See application file for complete search history.

(56) References Cited

U.S. PATENT DOCUMENTS

| | | | |
|---|---|---|---|
| 4,068,952 A * | 1/1978 | Erbert | G01S 7/497 356/4.02 |
| 9,983,311 B2 | 5/2018 | McPeek | |
| 10,520,482 B2 | 12/2019 | McPeek | |
| 10,534,086 B2 | 1/2020 | McPeek | |
| 10,539,545 B2 | 1/2020 | McPeek | |
| 2002/0140924 A1* | 10/2002 | Wangler | G01S 7/4802 356/28 |
| 2003/0202546 A1* | 10/2003 | Hartemann | G03F 7/70008 372/5 |
| 2007/0182528 A1* | 8/2007 | Breed | B60W 30/16 348/148 |
| 2011/0101239 A1* | 5/2011 | Woodhouse | G01S 7/4802 356/51 |
| 2013/0194787 A1* | 8/2013 | Geske | H01S 5/4087 362/231 |
| 2015/0377696 A1* | 12/2015 | Shpunt | H01S 5/4012 359/796 |
| 2018/0259645 A1* | 9/2018 | Shu | G01S 7/4866 |

(Continued)

*Primary Examiner* — Yuqing Xiao
*Assistant Examiner* — Benjamin Richard Hebert
(74) *Attorney, Agent, or Firm* — Allen, Dyer, Doppelt + Gilchrist, PA

(57) ABSTRACT

A remote sensing device may include a mobile platform, and a LIDAR transceiver carried by the mobile platform. The LIDAR transceiver may further include an optical source, a detector, and a duplex optical element coupled downstream from the optical source and upstream from the detector. The duplex optical element may be configured to direct an output of the optical source to a target, and direct a return optical signal reflected from the target to the detector.

20 Claims, 20 Drawing Sheets

(56) References Cited

U.S. PATENT DOCUMENTS

2019/0339356 A1* 11/2019 Schildknecht ........ G01J 1/0422
2020/0025923 A1*  1/2020 Eichenholz .......... G01S 17/931
2020/0033312 A1   1/2020 Overton et al.

\* cited by examiner

REMOTE SENSING DEVICE WITH DUPLEX OPTICAL ELEMENT AND RELATED METHODS

RELATED APPLICATION

This application is based upon prior filed Application No. 63/019,500 filed May 4, 2020, the entire subject matter of which is incorporated herein by reference in its entirety.

TECHNICAL FIELD

The present disclosure relates to the field of remote sensing, and, more particularly, to a laser remote sensing device and related methods.

BACKGROUND

Agriculture is an endeavor practiced for thousands of years. Nevertheless, the industry of agriculture has advanced greatly in the last few decades. Key tasks within agriculture are forecasting and prediction of crop yields, reduction of costs of production, and ensuring sustainable production practices.

For forecasting of crop yields, accurate and timely machine counting of fruit on the tree or vine may be helpful, and has long been considered impossible or impractical. Some approaches rely on manual estimation and are often inaccurate and labor intensive. Inaccurate estimates lead to inaccurate crop forecasts. This inaccuracy complicates pricing and grower's ability to forecast, plan, and optimize market timing participation.

Some approaches leverage Light Detection and Ranging (LIDAR) sensing to improve scalability and speed of crop analysis. For example, U.S. Pat. No. 9,983,311 to McPeek discloses a system for improved real-time yield monitoring and sensor fusion of crops in an orchard. This system includes a collection vehicle with LIDAR components onboard, which travels through an orchard.

SUMMARY

Generally, a remote sensing device may include a mobile platform, and a LIDAR transceiver carried by the mobile platform. The LIDAR transceiver may further include an optical source, a detector, and a duplex optical element coupled downstream from the optical source and upstream from the detector. The duplex optical element may be configured to direct an output of the optical source to a target, and direct a return optical signal reflected from the target to the detector.

More specifically, the duplex optical element may comprise an optical flat, and a reflective layer on the optical flat. In some embodiments, the reflective layer may be spaced apart from peripheral edges of the optical flat, and the output of the optical source may reflect from the reflective layer. The return optical signal may pass through the optical flat between the peripheral edges and the reflective layer. The reflective layer may define an opening. The output of the optical source may pass through the opening, and the return optical signal from the target may reflect from the reflective layer. Also, the optical flat may comprise a through-passageway aligned with the opening.

In some embodiments, the LIDAR transceiver may comprise a band pass filter coupled upstream of the detector. The band pass filter may have a pass band with a spectral width less than 50 nm. The optical source may comprise a laser source with a single longitudinal mode. The detector may include at least one of a multi-pixel photon counting (MPPC) detector, a silicon photomultiplier (SiPM) detector, and a Geiger mode avalanche photodiode (APD) detector. Also, the LIDAR transceiver may include a range gate configured to exclude returns outside a tree canopy.

Another aspect is directed to a method for making a remote sensing device. The method may include coupling a LIDAR transceiver to be carried by a mobile platform. The LIDAR transceiver may comprise an optical source, a detector, and a duplex optical element coupled downstream from the optical source and upstream from the detector. The duplex optical element may be configured to direct an output of the optical source to a target, and direct a return optical signal reflected from the target to the detector.

DETAILED DESCRIPTION

Figure 1:
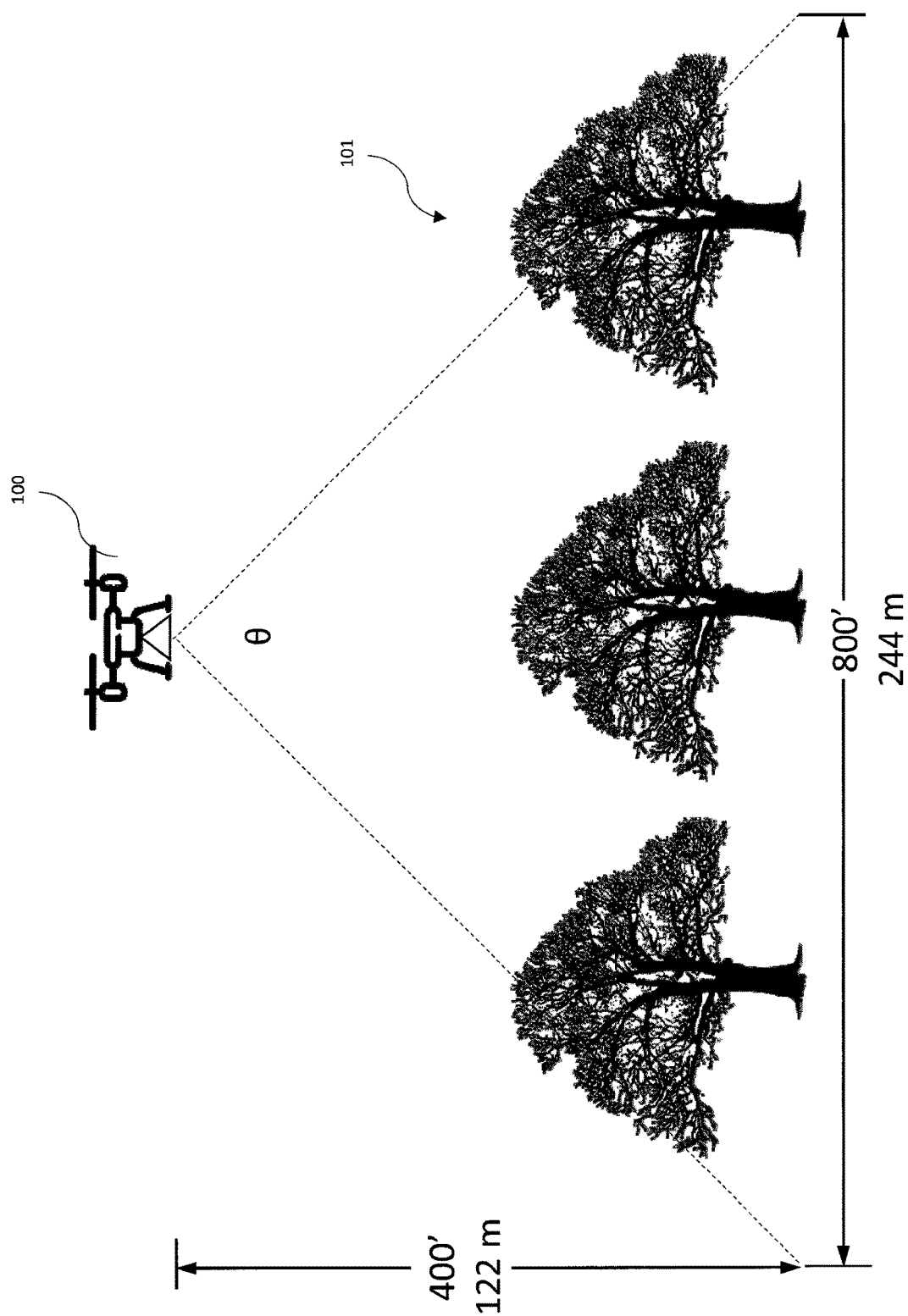
FIG. 1 is a schematic diagram of a remote sensing device during operation, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2A:
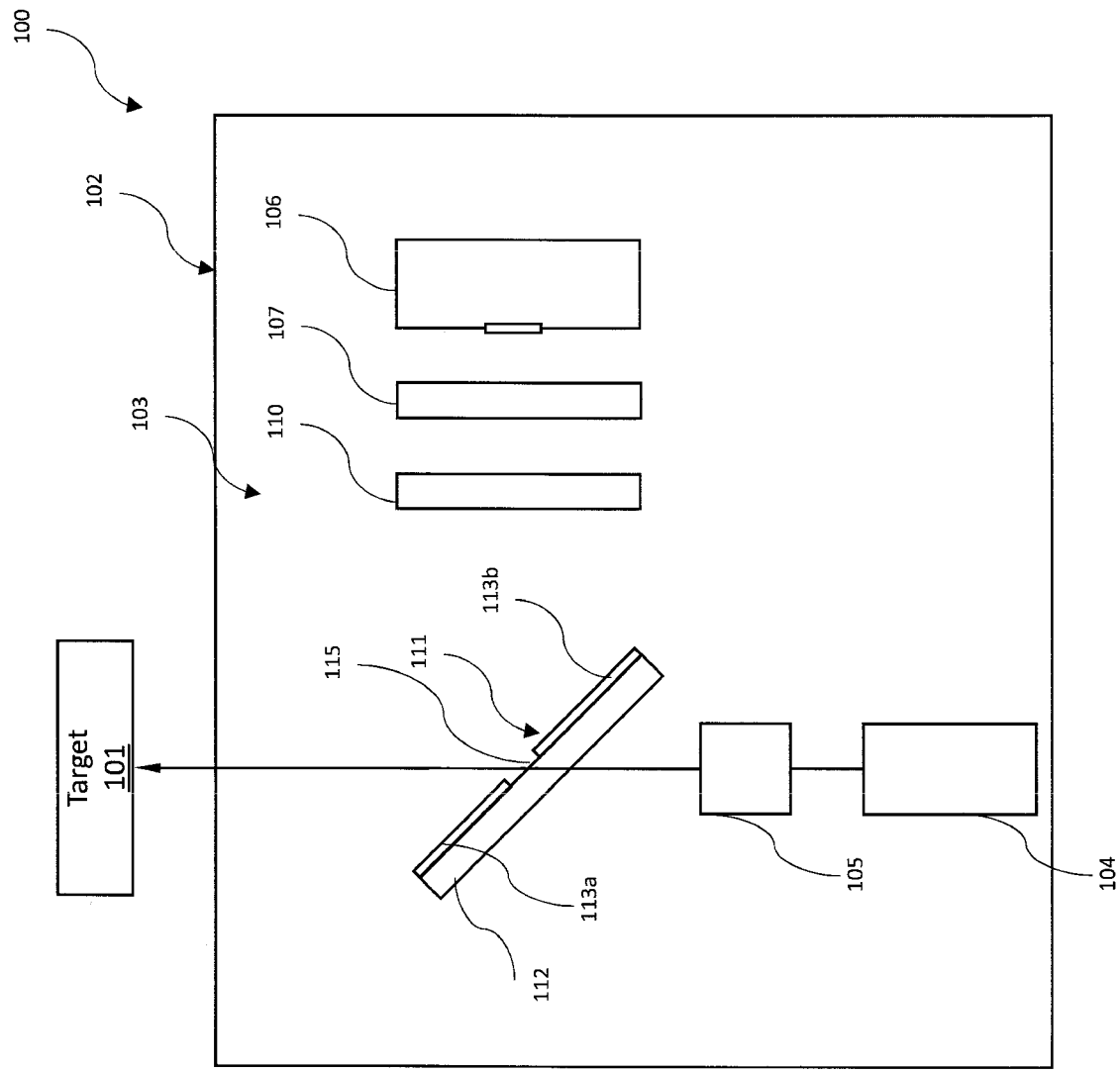
FIG. 2A is a schematic diagram of a first embodiment of a remote sensing device in a transmit mode, according to the present disclosure.
Figure 2B:
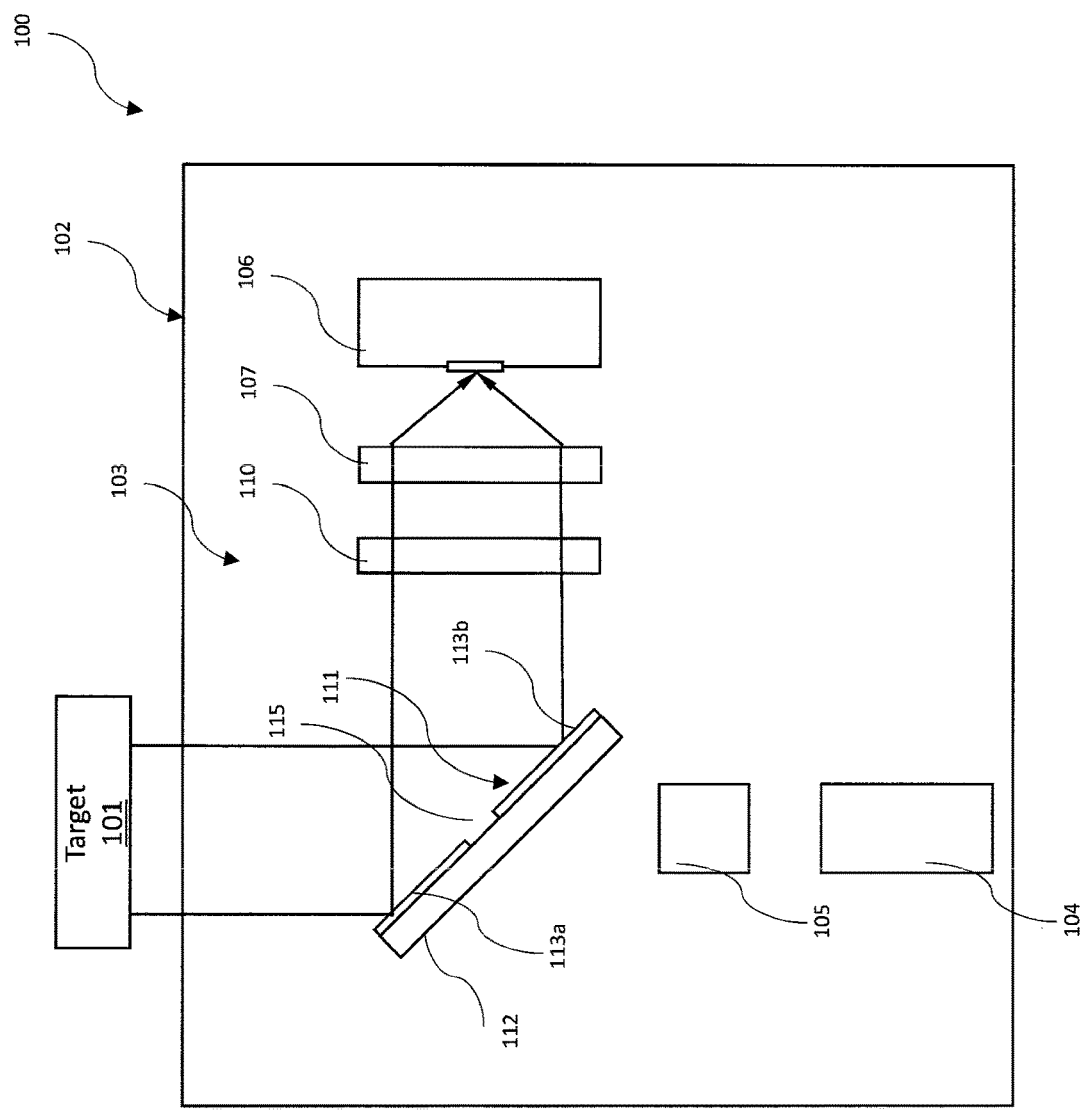
FIG. 2B is a schematic diagram of the first embodiment of the remote sensing device in a receive mode, according to the present disclosure.

Referring initially to FIGS. 1-2B, a remote sensing device 100 according to the present disclosure is now described. The remote sensing device 100 is configured to scan a target 101, illustratively a geospatial terrain. Of course, this application is merely exemplary and other targets are possible.

The remote sensing device 100 illustratively comprises a mobile platform 102 (e.g. the illustrated unmanned aerial vehicle (UAV), i.e. a drone platform). Of course, other embodiments of the remote sensing device 100 include different mobile platforms, such as an aircraft platform or a ground based vehicle platform.

The remote sensing device 100 comprises a LIDAR transceiver 103 carried by the mobile platform 102. The LIDAR transceiver 103 illustratively includes an optical source 104 (e.g. a laser), an optical transmit element 105 coupled downstream from the optical source, a detector 106, an optical receive element 107 coupled upstream of the detector, a band pass filter 110 (e.g. a narrow band pass filter with a pass band width of tens of nanometers and less) coupled upstream of the optical receive element, and a duplex optical element 111. The duplex optical element 111 is coupled between the optical transmit element 105 and the band pass filter 110.

The duplex optical element 111 may comprise an optical flat 112, and first and second reflective coating layers 113a-113b. The first and second reflective coating layers 113a-113b may comprise one or more of silver, gold, or any highly reflective material as appropriate to the wavelength of the optical source.

The duplex optical element 111 is configured to direct an output of the optical source to the target 101, and direct a return optical signal from the target 101 to the band pass filter 110. In other words, the duplex optical element 111 is a bidirectional optical element.

The detector 106 may comprise a single photon sensitive detector, for example. The single photon sensitive detector may include one or more of a MPPC detector, a SiPM detector, and a Geiger mode APD detector. Because single photon sensitive detectors typically have limited dynamic range in high contrast situations, the detector 106 may execute at least two methods of increasing the dynamic range as a function of scene contrast. Firstly, the detector 106 may adjust bias voltage to alter sensitivity of detector. Secondly, the detector 106 may include electronically controlled neutral density filter on one of the transmit and receive paths or both paths.

In typical approaches, mechanically driven filters may be used, which are larger and orders of magnitude slower to respond. Whereas, with the detector 106, typical response times of electronically controlled neutral density filters are tens to hundreds of milliseconds.

Also, the detector 106 comprises a plurality of detector elements (i.e. pixels), and the detector 106 is configured to determine time of flight calculations for each detector element. Also, helpfully, the LIDAR transceiver 103 may be more scalable than typical approaches.

As will be appreciated, the LIDAR transceiver 103 may comprise a Risley (Lissajous) Scanner in some embodiments. In particular, the illustrated embodiment of the duplex optical element 111 includes the optical flat 112 as a base, but in other Risley Scanner embodiments (FIGS. 9A-10C), as a single or multiple optical wedge elements can be used. Also, in other embodiments, the LIDAR transceiver 103 may comprise holographic optical elements.

In some embodiments, the optical source 104 may comprise a single longitudinal mode (SML), i.e. extremely narrow spectral bandwidth (tens of nanometers and less), microchip laser. This allows the use of ultra narrow bandpass filter (NBPF), and reduces solar background compared to typical designs using NBPFs and lasers with wider spectral widths, for example, interference filters and pulsed laser diodes (PLD). In some embodiments, beam shaping optics may transform Gaussian laser beam shape to top-hat pattern with aspect ratio conforming to that of the detector array.

Advantageously, the LIDAR transceiver 103 eliminates parallax error inherent to independent transmit and receive approaches. Also, the LIDAR transceiver 103 may have a reduced parts count as compared to typical approaches and may be less expensive to manufacture.

In the illustrated example of FIG. 1, in typical approaches, the remote sensing device 100 has a design range of 400' against 10% diffuse reflector, and a small detector field of view. A high sample density and collection from multiple angles is required for effective foliage penetration.

Another aspect is directed to a method for making a remote sensing device 100. The method comprises coupling a LIDAR transceiver 103 to be carried by a mobile platform 102. The LIDAR transceiver 103 comprises an optical source 104, an optical transmit element 105 coupled downstream from the optical source, a detector 106, an optical receive element 107 coupled upstream of the detector, a band pass filter 110 coupled upstream of the optical receive element, and a duplex optical element 111. The duplex optical element 111 is coupled downstream from the optical transmit element 105 and configured to direct an output of the optical source 104 to a target 101, and direct a return optical signal from the target to the band pass filter.

Figure 3A:
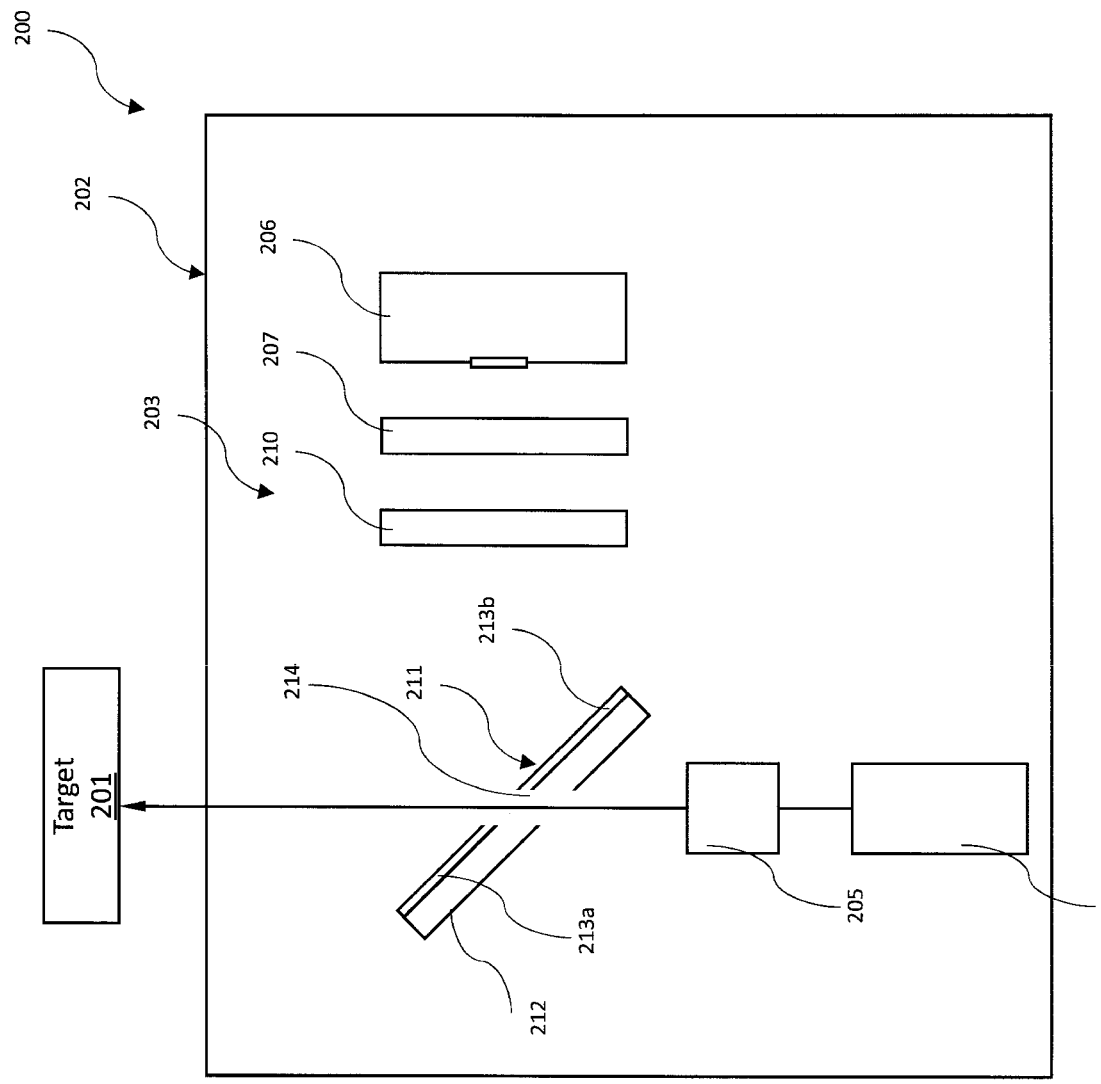
FIG. 3A is a schematic diagram of a second embodiment of the remote sensing device in a transmit mode, according to the present disclosure.
Figure 3B:
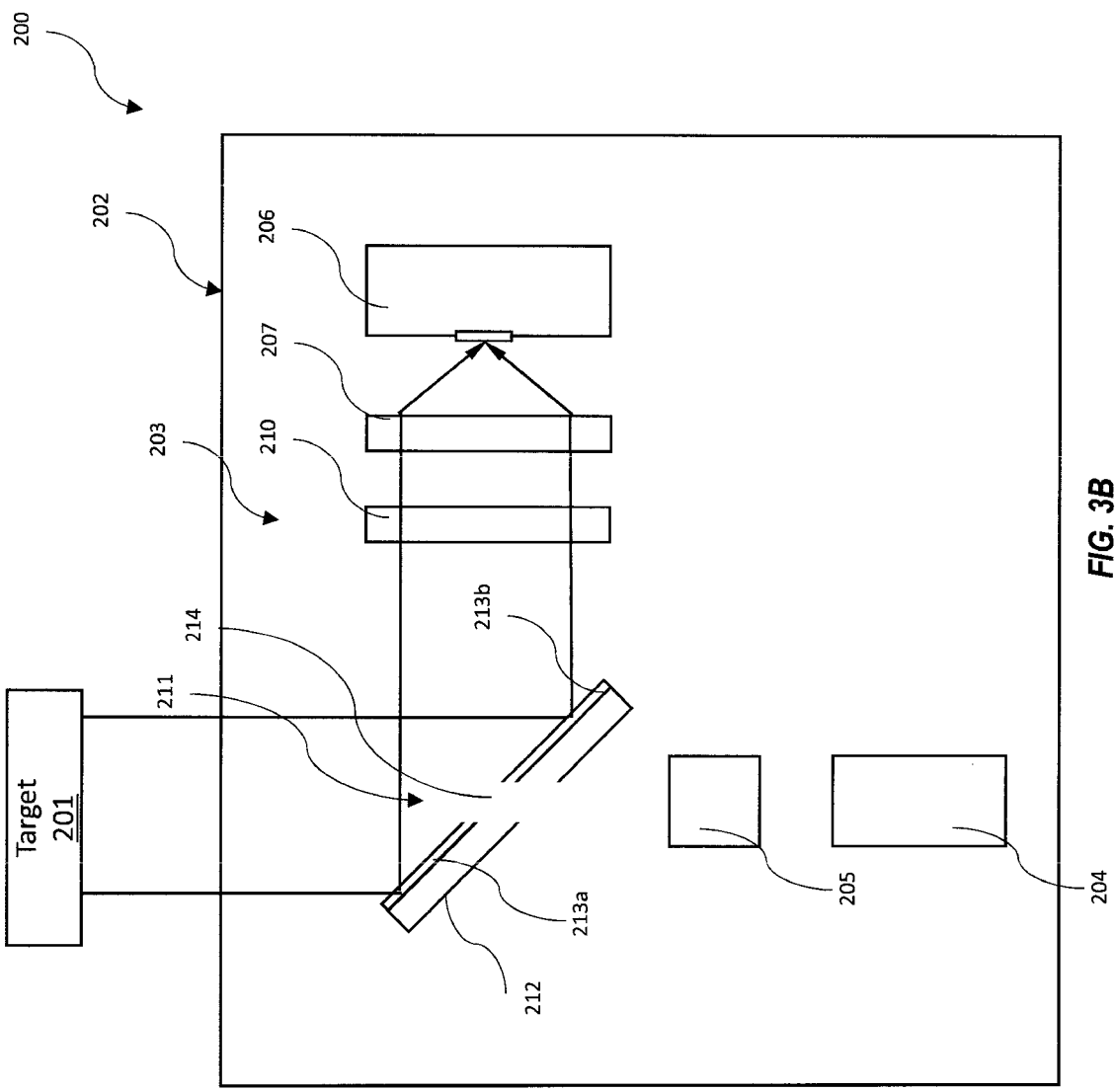
FIG. 3B is a schematic diagram of the second embodiment of the remote sensing device in a receive mode, according to the present disclosure.

Referring now additionally to FIGS. 3A-3B, another embodiment of the LIDAR transceiver 203 is now described. In this embodiment of the LIDAR transceiver 203, those elements already discussed above with respect to FIGS. 1-2B are incremented by 100 and most require no further discussion herein. This embodiment differs from the previous embodiment in that this LIDAR transceiver 203 illustratively includes the duplex optical element 211 having a through-passageway 214 permitting the output of the optical source 204 to a target 201.

Figure 4A:
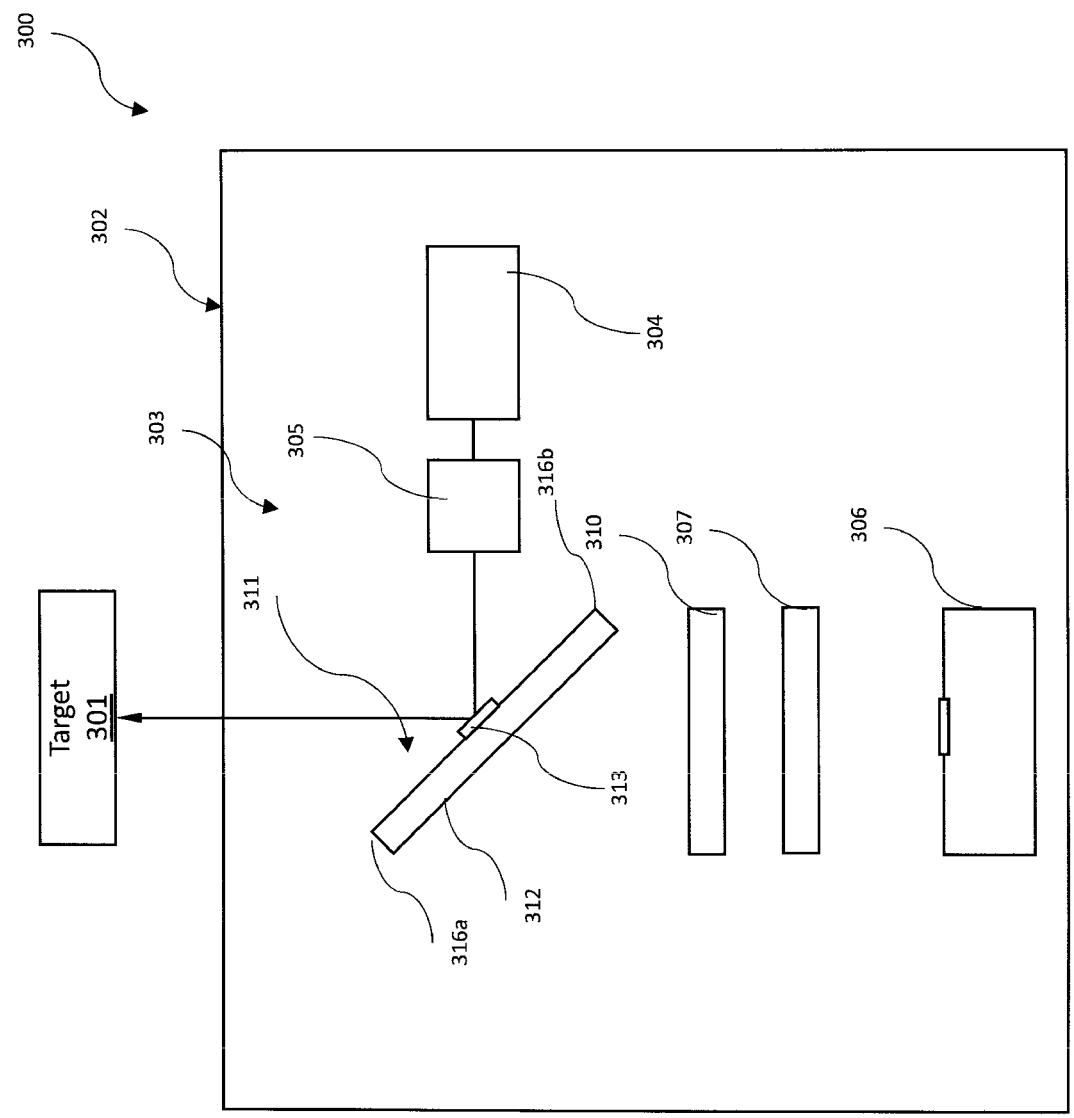
FIG. 4A is a schematic diagram of a third embodiment of the remote sensing device in a transmit mode, according to the present disclosure.
Figure 4B:
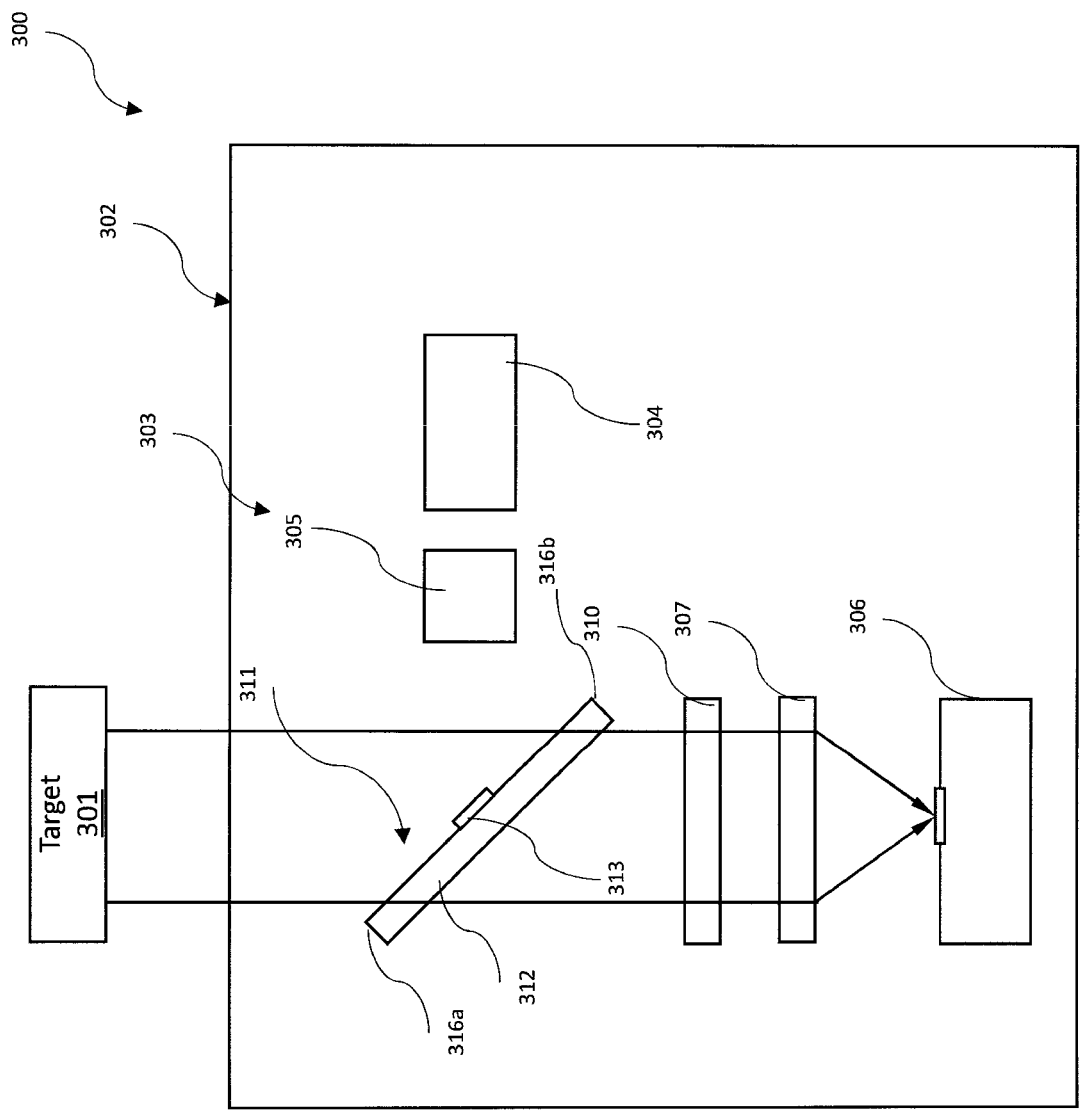
FIG. 4B is a schematic diagram of the third embodiment of the remote sensing device in a receive mode, according to the present disclosure.
Figure 5A:
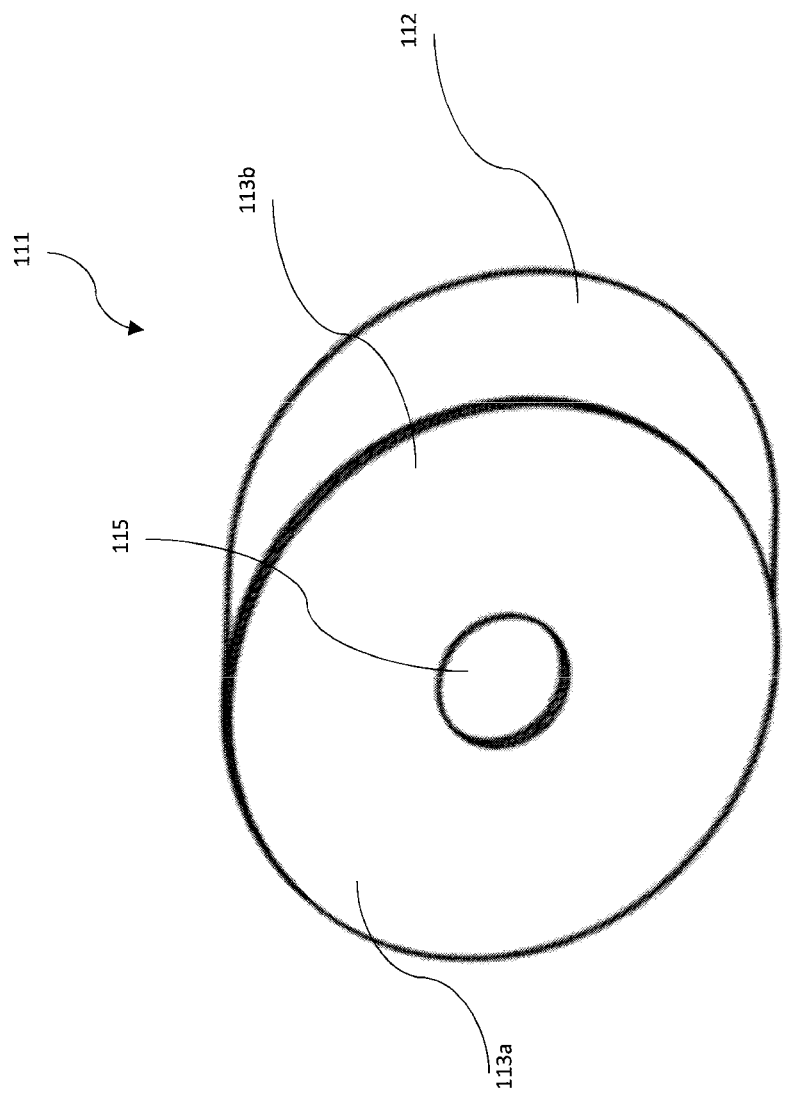
FIGS. 5A-5B are schematic perspective and side views, respectively, of a duplex optical element from the first embodiment of the remote sensing device of FIGS. 2A-2B.
Figure 5B:
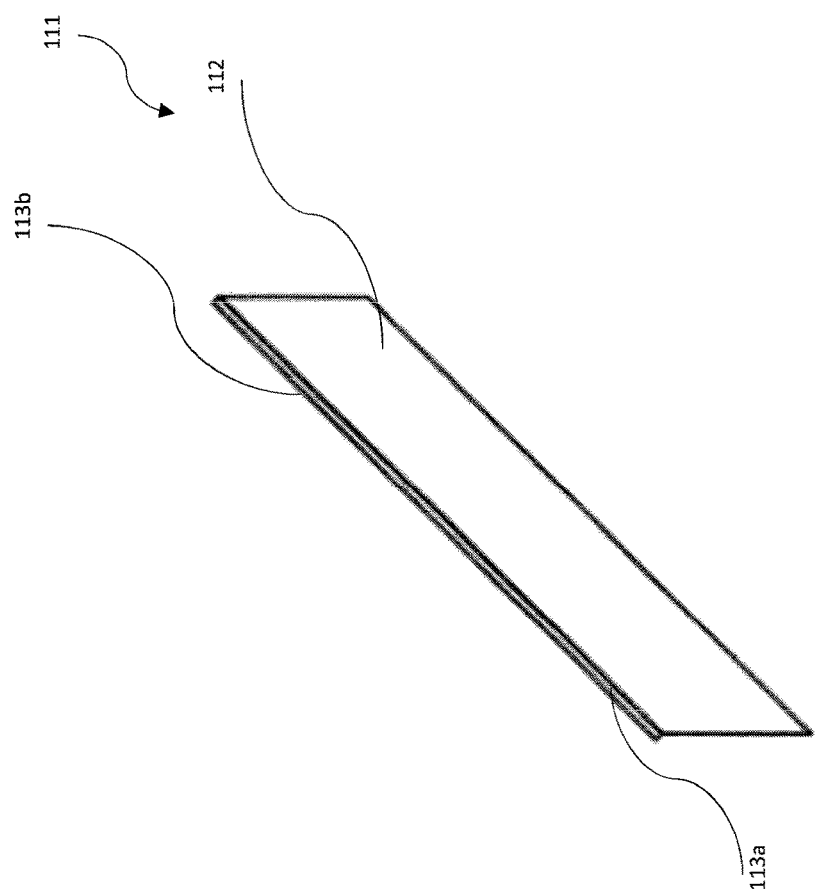
Figure 6A:
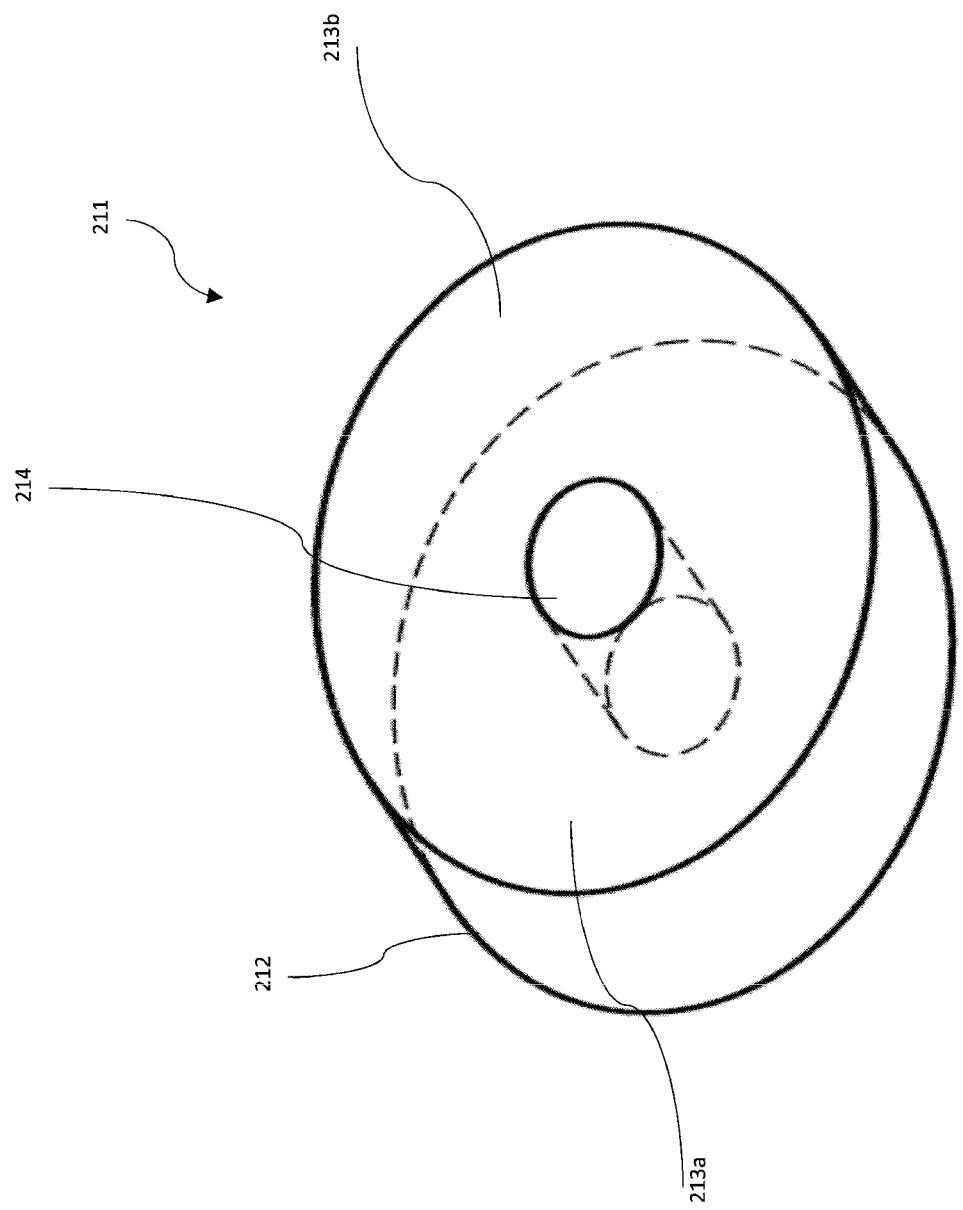
FIGS. 6A-6B are schematic perspective and side views, respectively, of a duplex optical element from the second embodiment of the remote sensing device of FIGS. 3A-3B.
Figure 6B:
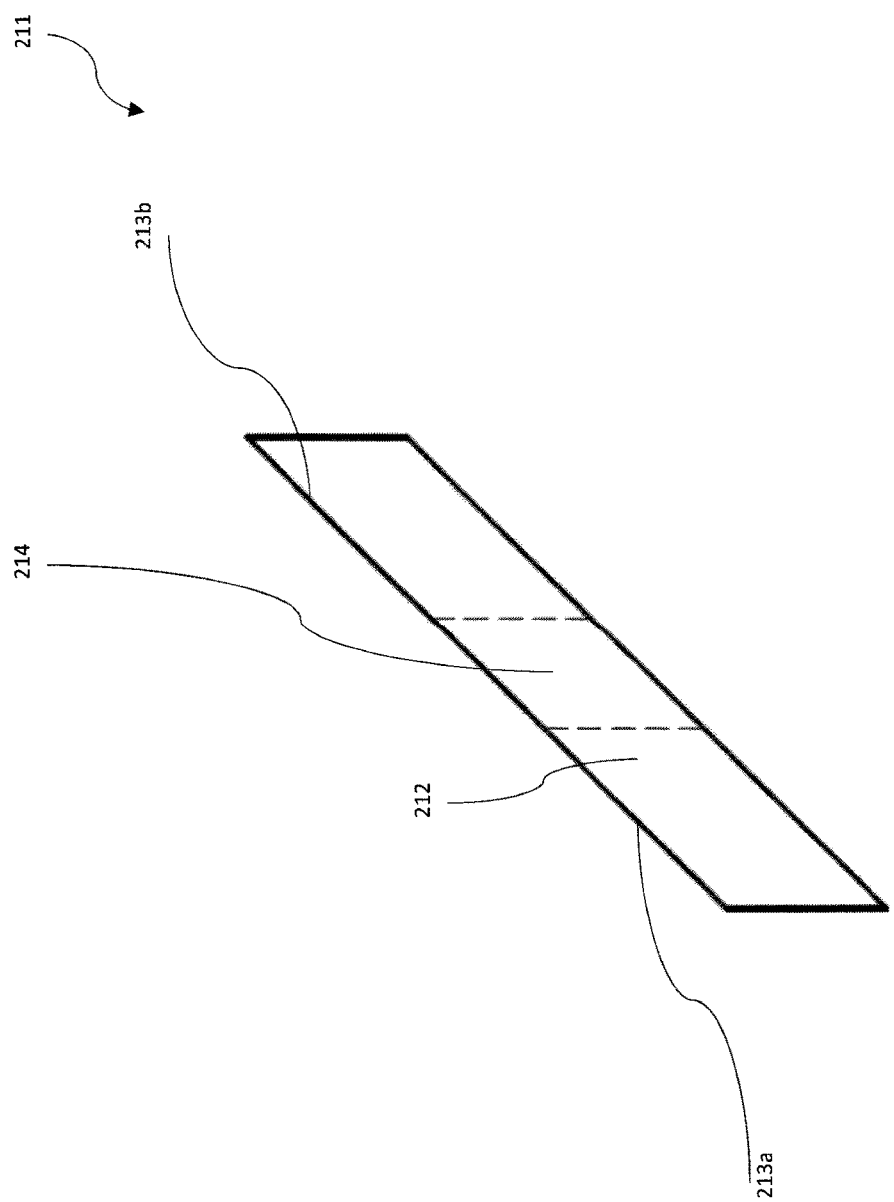

Referring now additionally to FIGS. 4A-4B, another embodiment of the LIDAR transceiver 303 is now described. In this embodiment of the LIDAR transceiver 303, those elements already discussed above with respect to FIGS. 1-2B are incremented by 200 and most require no further discussion herein. This embodiment differs from the previous embodiment in that this LIDAR transceiver 303 illustratively includes the duplex optical element 311 having a reflective coating layer 313 configured to reflect the output of the optical source 304 to a target 301 in a transmit mode. The reflective coating layer 313 may incorporate beam transmit beam shaping optics via use of a Diffractive Optical Element (DOE) or Holographic Optical Element (HOE).

Figure 7:
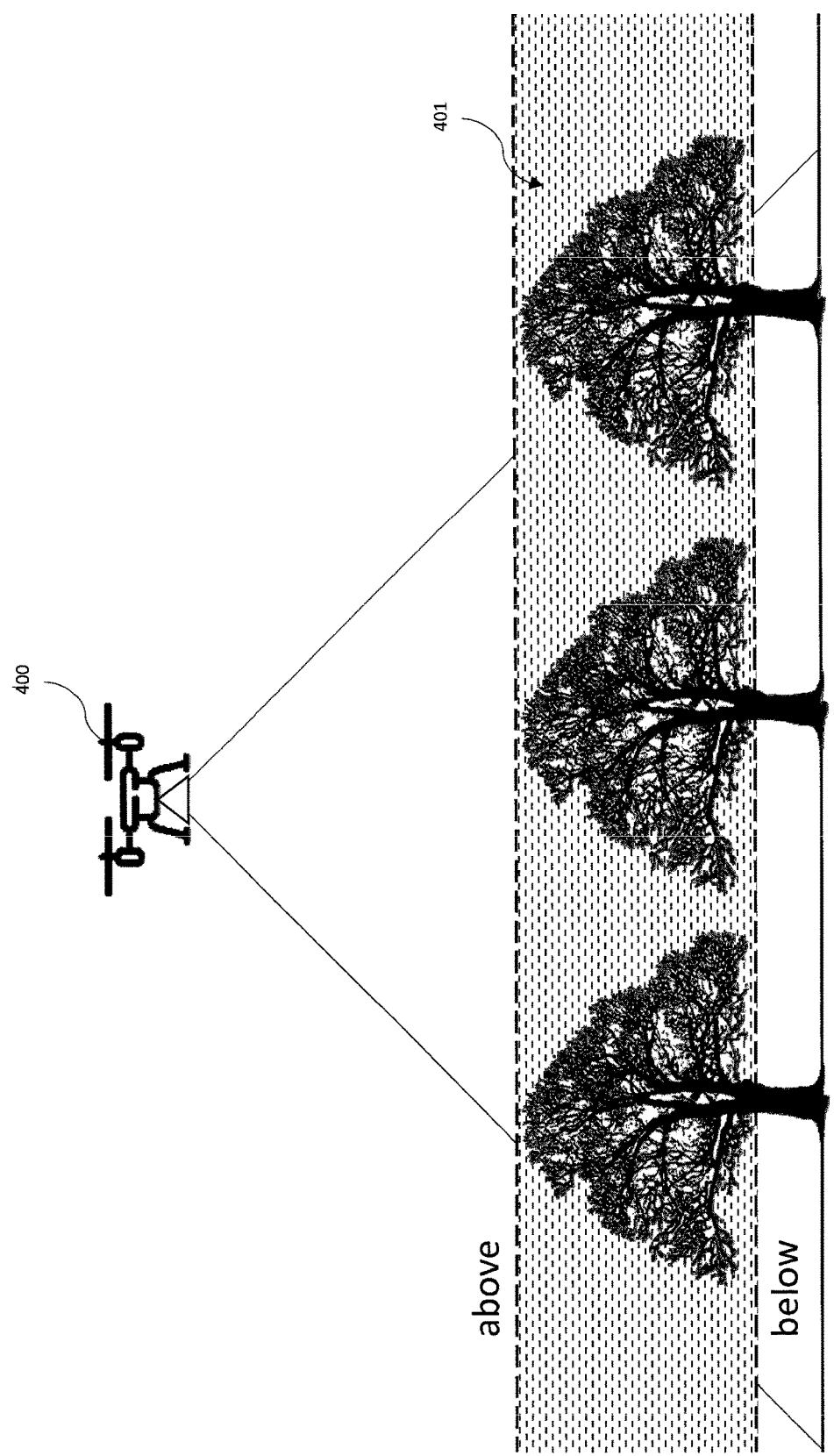
FIG. 7 is a schematic diagram of a fourth embodiment of the remote sensing device during operation, according to the present disclosure.

Referring now additionally to FIG. 7, another embodiment of the remote sensing device 400 is now described. In this embodiment of the remote sensing device 400, those elements already discussed above with respect to FIGS. 1-2B are incremented by 300 and most require no further discussion herein. In this embodiment, the remote sensing device 400 may reduce "blanking" loss.

Given a detector, which once triggered cannot be triggered again until reset (actively or passively), the probability of a detection in the $i^{th}$ bin depends not only on the Photon Detection Efficiency (PDE) of the detector but also whether or not that detector has been already triggered in the i–1 preceding bins.

$$P(i^{th}\text{ bin}) = P(\text{no return in preceding } i\text{–}1 \text{ bins}) * PDE$$

If the range gate is opened above the canopy, there will be less opportunity to capture returns from below the canopy due to the reset time of the detectors triggered by the canopy. As shown, the range gate is set to exclude returns above the tree canopy and below the tree canopy. In other words, the LIDAR transceiver comprises a range gate configured to exclude returns outside a tree canopy 401.

Figure 8A:
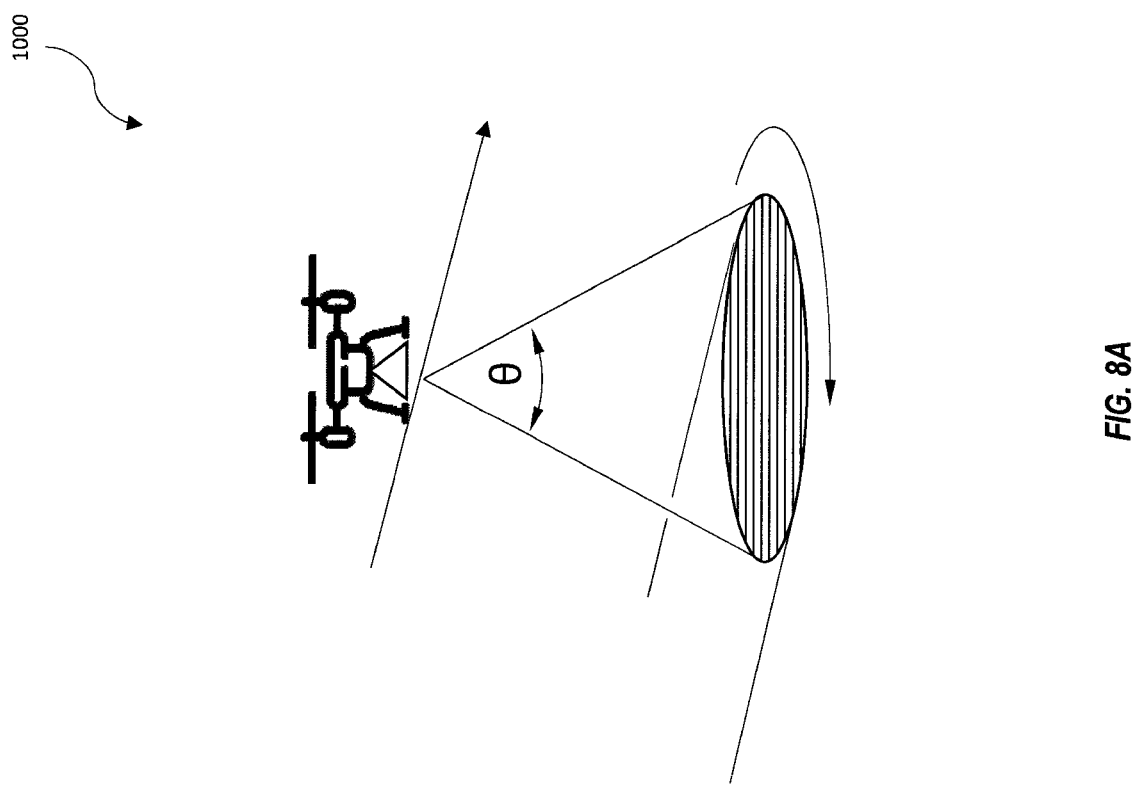
FIGS. 8A-8B are schematic diagrams of a remote sensing device during a conical scan mode and a linear scan mode, respectively, according to the present disclosure.
Figure 8B:
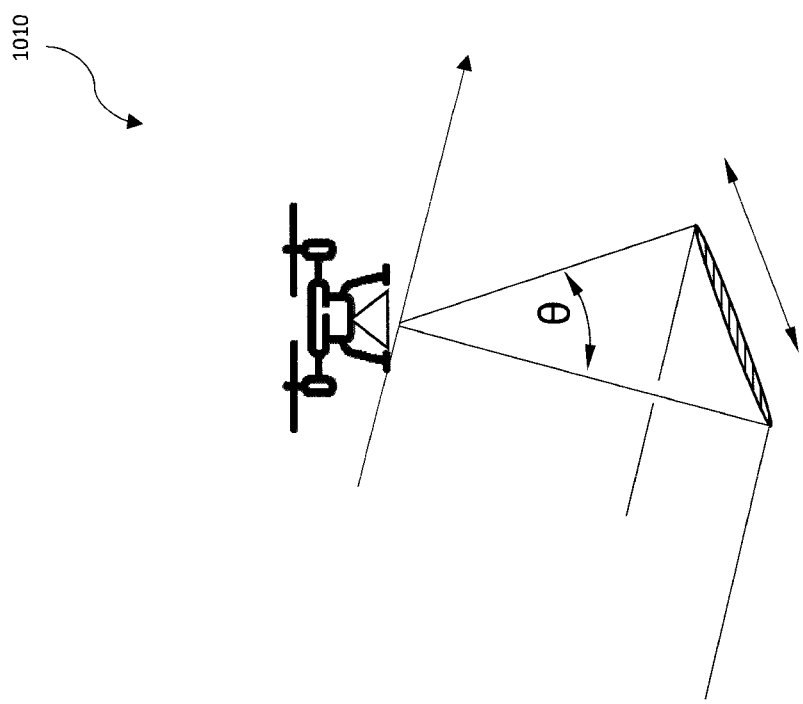

Referring now to FIGS. 8A-8B, diagrams 1000, 1010 show a Risley (Lissajous) Scanner having variable half angle conical and linear scans, and on-the-fly changes between patterns possible. Diagram 1000 shows the conical scan where 8 varies, and diagram 1010 shows a linear scan where 8 varies. Advantageously, this provides a remote sensing device that is simple and lightweight, and having low Size, Weight and Power (SWaP) requirements.

Figure 9A:
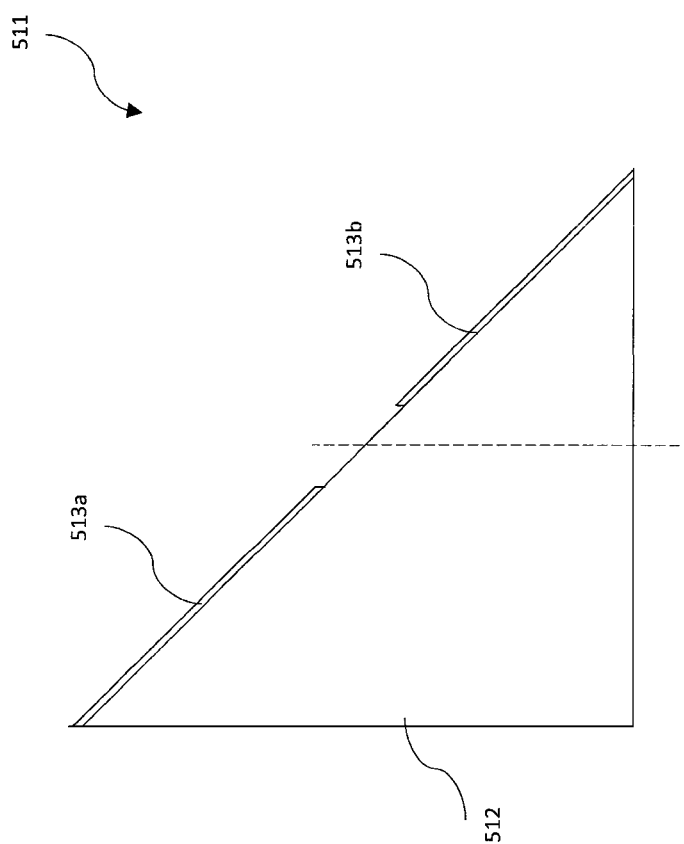
FIGS. 9A-9C are schematic diagrams of the duplex optical element from a fifth embodiment of the remote sensing device in the off mode, the transmit mode, and the receive mode, respectively, according to the present disclosure.
Figure 9B:
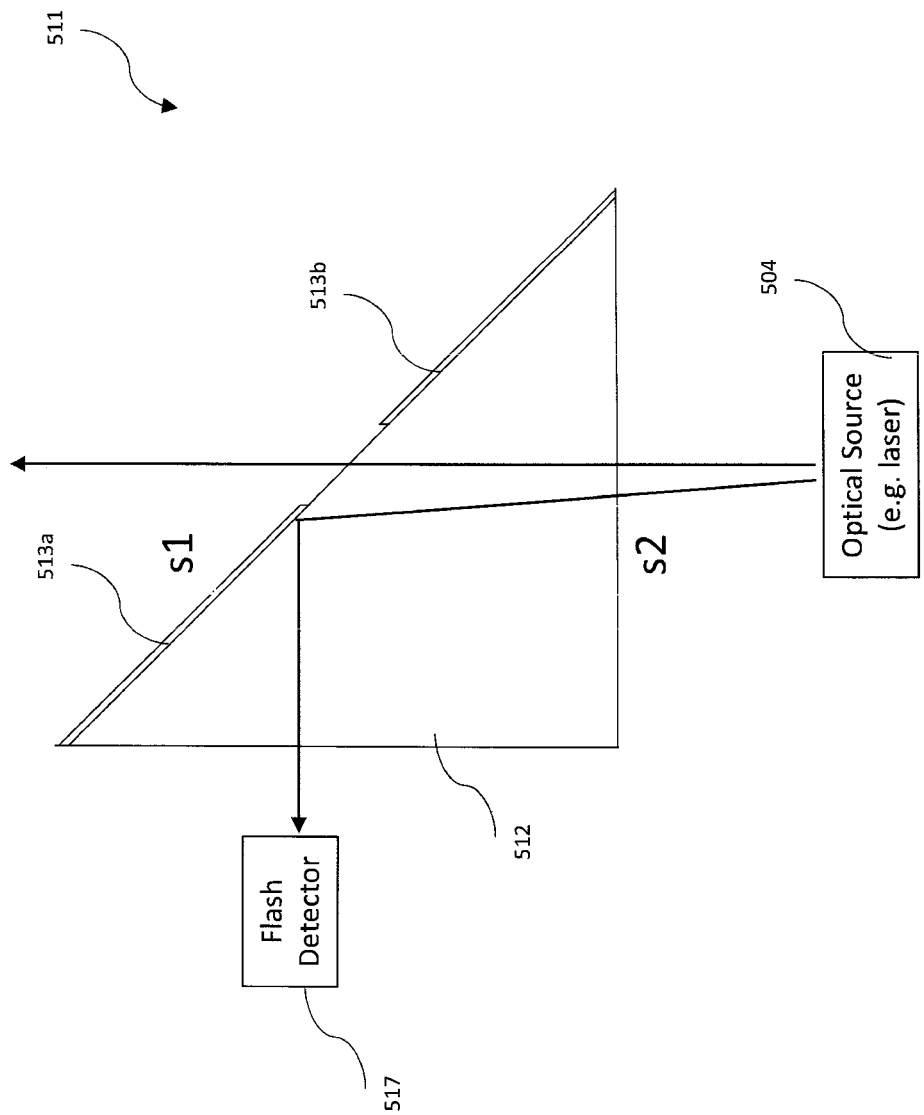
Figure 9C:
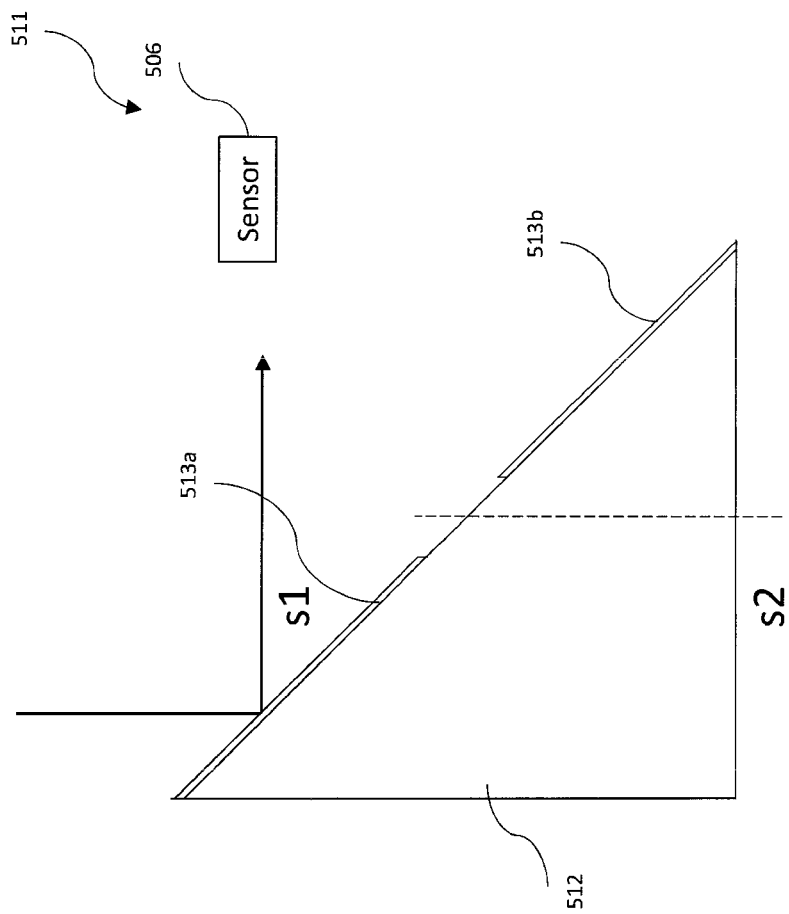

Referring now additionally to FIGS. 9A-9C, another embodiment of the duplex optical element 511 is now described. In this embodiment of the duplex optical element 511, those elements already discussed above with respect to FIGS. 1-2B are incremented by 400 and most require no further discussion herein. This embodiment differs from the previous embodiment in that this duplex optical element 511 illustratively comprises a right angle prism. Also, a flash detector circuit 517 is coupled to receive a portion of the output from the optical source 504. As will be appreciated, the flash detector circuit 517 may be used to establish the time the transmitted laser pulse is launched, marking the beginning of the time-of-flight range measurement.

Figure 10A:
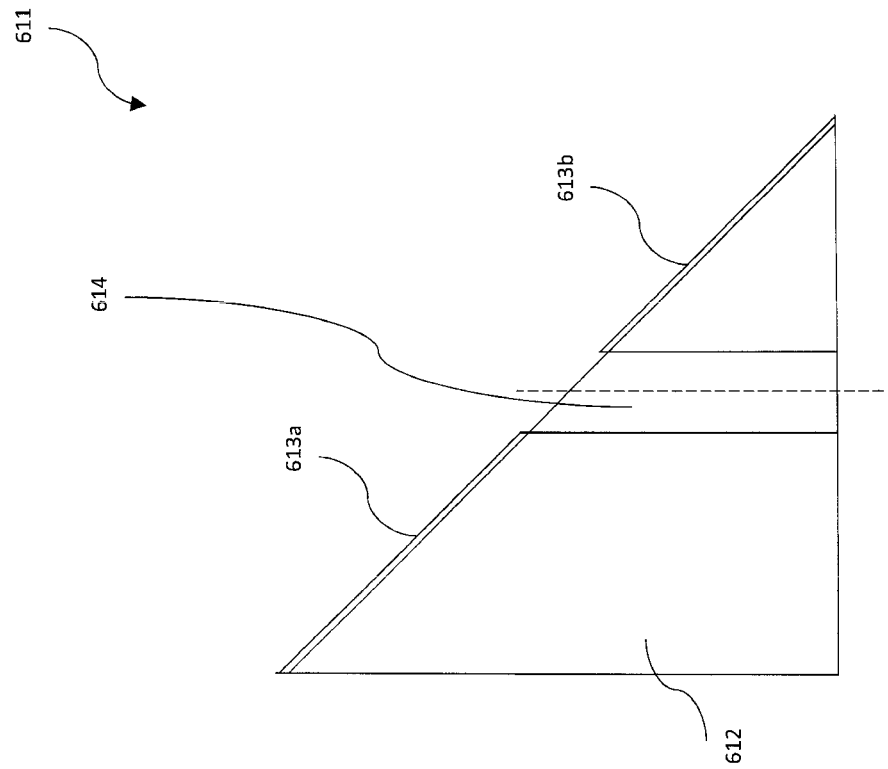
FIGS. 10A-10C are schematic diagrams of the duplex optical element from a sixth embodiment of the remote sensing device in the off mode, the transmit mode, and the receive mode, respectively, according to the present disclosure.
Figure 10B:
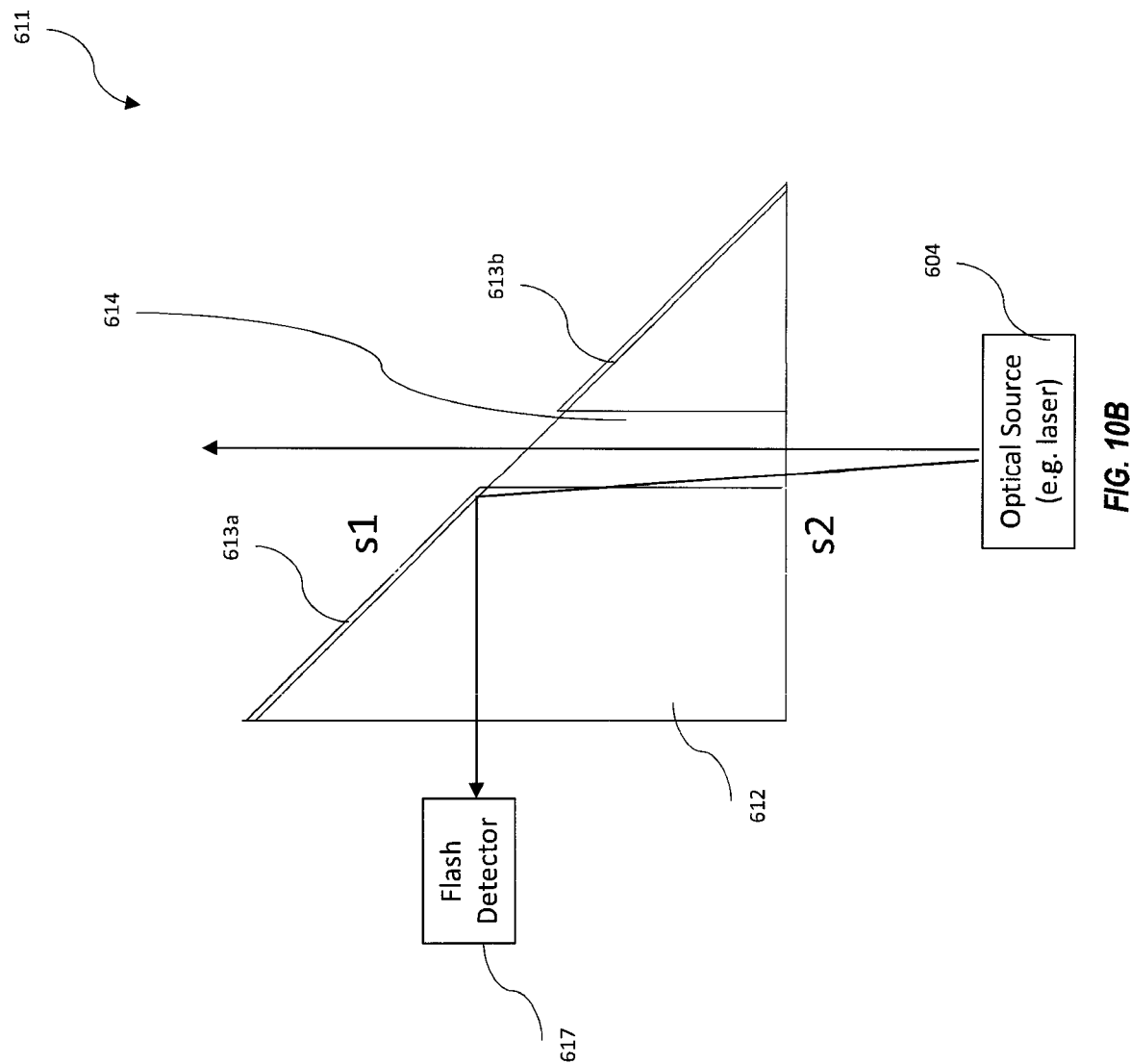
Figure 10C:
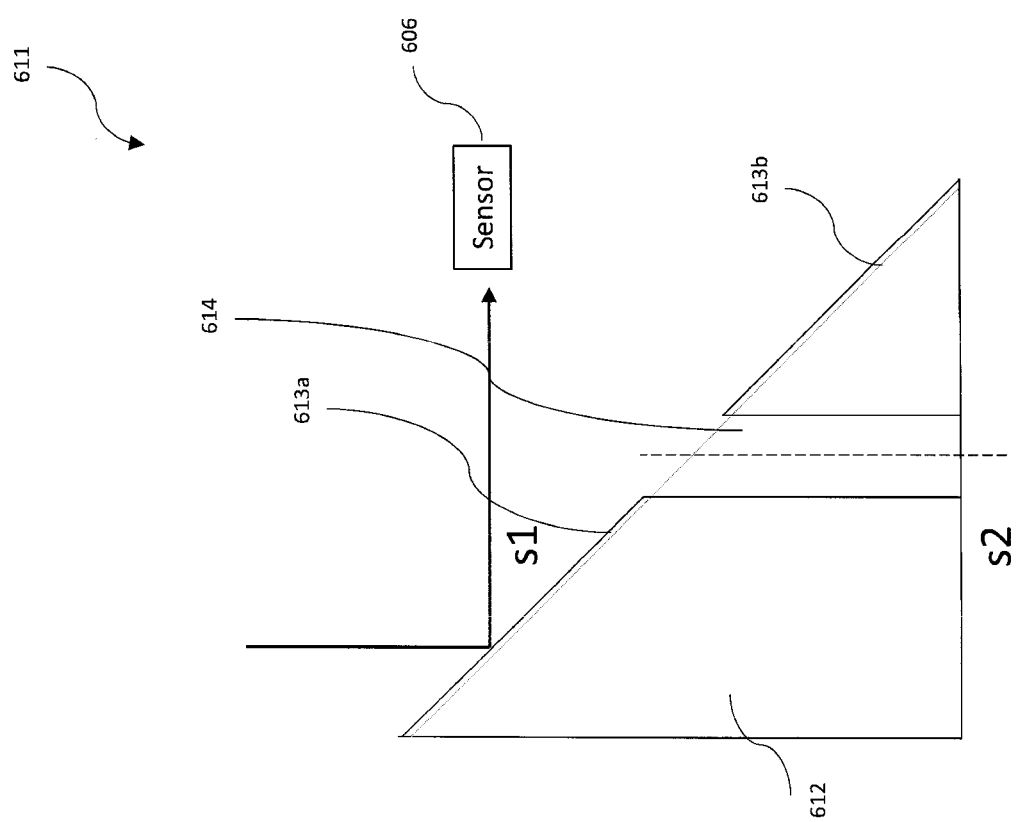

Referring now additionally to FIGS. 10A-10C, another embodiment of the duplex optical element 611 is now described. In this embodiment of the duplex optical element 611, those elements already discussed above with respect to FIGS. 1-2B are incremented by 500 and most require no further discussion herein. This embodiment differs from the previous embodiment in that this duplex optical element 611 illustratively comprises an elliptical mirror.

Referring again to FIGS. 2A-2B & 5A-5B, a remote sensing device 100 is for sensing a target 101. As will be appreciated, the target 101 may comprise one or more agricultural crops, and the remote sensing device 100 may sense a plurality of parameters regarding the one or more agricultural crops.

The remote sensing device 100 illustratively includes a mobile platform 102, and a LIDAR transceiver 103 carried by the mobile platform. The LIDAR transceiver 103 further includes an optical source 104, a detector 106, and a duplex optical element 111 coupled downstream from the optical source and upstream from the detector. For example, the optical source 104 comprises a laser source with a single longitudinal mode. Also, the detector 106 may include at least one of a MPPC detector, a SiPM detector, and a Geiger mode APD detector.

Here, the LIDAR transceiver 103 comprises a band pass filter 110 coupled upstream of the detector 106. The band pass filter may have a pass band with a spectral width less than 50 nm. The duplex optical element 111 is illustratively configured to direct an output of the optical source 104 to the target 101, and direct a return optical signal reflected from the target to the detector 106. The duplex optical element 111 comprises an optical flat 112, and a reflective layer 113a-113b on the optical flat. The reflective layer 113a-113b may comprise a coating reflective layer in some embodiments. In other embodiments, the reflective layer 113a-113b may be deposited on the optical flat 112 via other methods, for example sputtering.

The reflective layer 113a-113b defines an opening 115, and the output of the optical source 104 passes first through the optical flat 112 and secondly through the opening. The return optical signal from the target 101 reflects from the reflective layer 113a-113b.

Another aspect is directed to a method for making a remote sensing device 100. The method includes coupling a LIDAR transceiver 103 to be carried by a mobile platform 102. The LIDAR transceiver 103 comprises an optical source 104, a detector 106, and a duplex optical element 111 coupled downstream from the optical source and upstream from the detector. The duplex optical element 111 is configured to direct an output of the optical source 104 to a target 101, and direct a return optical signal reflected from the target to the detector 106.

Referring again to FIGS. 3A-3B & 6A-6B, another embodiment of the remote sensing device 200 is now described. In this embodiment of the remote sensing device 200, those elements already discussed above with respect to FIGS. 1-2B are incremented by 100 and most require no further discussion herein. This embodiment differs from the previous embodiment in that this remote sensing device 200 illustratively includes the optical flat 212 comprising a through-passageway 214 aligned with the opening 215. In some embodiments, the through-passageway 214 is not centered, as illustrated, and is offset.

Referring again to FIGS. 4A-4B, another embodiment of the remote sensing device 300 is now described. In this embodiment of the remote sensing device 300, those elements already discussed above with respect to FIGS. 1-2B are incremented by 200 and most require no further discussion herein. This embodiment differs from the previous embodiment in that this remote sensing device 300 illustratively includes the reflective layer 313 medially placed on the optical flat 312. The reflective layer 313 is spaced apart from peripheral edges 316a-316b of the optical flat 312. The output of the optical source 304 reflects from the reflective layer 313, and the return optical signal passes through the optical flat 312 between the peripheral edges 316a-316b and the reflective layer.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A remote sensing device comprising:
   a mobile platform; and
   a Light Detection and Ranging (LIDAR) transceiver carried by said mobile platform and comprising
      an optical source,
      a detector,
      a duplex optical element coupled downstream from said optical source and upstream from said detector, said duplex optical element comprising an optical flat, and a reflective layer on said optical flat defining an opening therein, said duplex optical element configured to direct an output of said optical source through the optical flat at the opening and directly to a target, and direct a return optical signal reflected from the target to said detector via the reflective layer, and a range gate configured to exclude returns outside a tree canopy.

2. The remote sensing device of claim 1 wherein said optical flat comprises a through-passageway aligned with the opening.

3. The remote sensing device of claim 1 wherein said LIDAR transceiver comprises a band pass filter coupled upstream of said detector.

4. The remote sensing device of claim 3 wherein said band pass filter has a pass band with a spectral width less than 50 nm.

5. The remote sensing device of claim 1 wherein said optical source comprises a laser source with a single longitudinal mode.

6. The remote sensing device of claim 1 wherein said reflective layer comprises at least one of gold and silver.

7. The remote sensing device of claim 1 wherein said detector comprises a single photon optical detector; wherein said LIDAR transceiver comprises a neutral density filter configured to increase dynamic range as a function of scene contrast; and wherein said detector is configured to adjust a bias voltage to increase dynamic range as a function of scene contrast.

8. A remote sensing device comprising:
a mobile platform; and
a Light Detection and Ranging (LIDAR) transceiver carried by said mobile platform and comprising
an optical source,
a detector,
a band pass filter coupled upstream of said detector, and
a duplex optical element coupled downstream from said optical source and upstream from said detector, said duplex optical element comprising an optical flat, and a reflective layer on said optical flat defining an opening therein,
said duplex optical element configured to direct an output of said optical source through the optical flat at the opening and directly to a target, and direct a return optical signal reflected from the target to said detector via the reflective layer,
a range gate configured to exclude returns outside a tree canopy, and
a neutral density filter configured to increase dynamic range as a function of scene contrast.

9. The remote sensing device of claim 8 wherein said optical flat comprises a through-passageway aligned with the opening.

10. The remote sensing device of claim 8 wherein said band pass filter has a pass band with a spectral width less than 50 nm.

11. The remote sensing device of claim 8 wherein said optical source comprises a laser source with a single longitudinal mode.

12. A method for making a remote sensing device, the method comprising:
coupling a Light Detection and Ranging (LIDAR) transceiver to be carried by a mobile platform, the LIDAR transceiver comprising
an optical source,
a detector,
a duplex optical element coupled downstream from the optical source and upstream from the detector, the duplex optical element comprising an optical flat, and a reflective layer on the optical flat defining an opening therein,
the duplex optical element configured to direct an output of the optical source through the optical flat at the opening and directly to a target, and direct a return optical signal reflected from the target to the detector via the reflective layer, and
a range gate configured to exclude returns outside a tree canopy.

13. The method of claim 12 wherein the optical flat comprises a through-passageway aligned with the opening.

14. The method of claim 12 wherein the LIDAR transceiver comprises a band pass filter coupled upstream of the detector.

15. The method of claim 14 wherein the band pass filter has a pass band with a spectral width less than 50 nm.

16. The method of claim 12 wherein the optical source comprises a laser source with a single longitudinal mode.

17. The method of claim 12 wherein the reflective layer comprises at least one of gold and silver.

18. The method of claim 12 wherein the detector comprises a single photon optical detector.

19. The method of claim 12 wherein the LIDAR transceiver comprises a neutral density filter configured to increase dynamic range as a function of scene contrast.

20. The method of claim 12 wherein the detector is configured to adjust a bias voltage to increase dynamic range as a function of scene contrast.

* * * * *